United States Patent
Stoffer et al.

(10) Patent No.: US 12,541,097 B2
(45) Date of Patent: Feb. 3, 2026

(54) OPTICAL PATH TRACING IN AN OPTICAL CIRCUIT DESIGN

(71) Applicant: Synopsys, Inc., Mountain View, CA (US)

(72) Inventors: Remco Stoffer, Enschede (NL); Teunis Dubbink, Enschede (NL)

(73) Assignee: Synopsys, Inc., Sunnyvale, CA (US)

( * ) Notice: Subject to any disclaimer, the term of this patent is extended or adjusted under 35 U.S.C. 154(b) by 734 days.

(21) Appl. No.: 17/942,003

(22) Filed: Sep. 9, 2022

(65) Prior Publication Data

US 2023/0083003 A1    Mar. 16, 2023

Related U.S. Application Data

(60) Provisional application No. 63/242,961, filed on Sep. 10, 2021.

(51) Int. Cl.
   *G02B 27/00*    (2006.01)
(52) U.S. Cl.
   CPC ................ *G02B 27/0012* (2013.01)
(58) Field of Classification Search
   USPC ......................................................... 716/126
   See application file for complete search history.

(56) References Cited

U.S. PATENT DOCUMENTS

| | | |
|---|---|---|
| 6,308,305 B1 | 10/2001 | Sugiyama et al. |
| 10,963,610 B1 | 3/2021 | Keller et al. |
| 2006/0062519 A1* | 3/2006 | Kish, Jr. ............. H01S 5/02415 385/5 |
| 2010/0096011 A1* | 4/2010 | Griffiths ................. G02B 5/288 257/E31.127 |
| 2015/0296279 A1* | 10/2015 | Bouda ................. H04J 14/0269 398/45 |
| 2021/0181414 A1 | 6/2021 | Hakkers |
| 2022/0291461 A1* | 9/2022 | Elsinger ............. G02B 6/12004 |
| 2022/0404566 A1* | 12/2022 | Giles ..................... G02B 6/4227 |
| 2023/0083003 A1* | 3/2023 | Stoffer .................. G06F 30/367 716/126 |

FOREIGN PATENT DOCUMENTS

CN            102594440 B      2/2015

OTHER PUBLICATIONS

Internatinoal Applicaiton No. PCT/US2022/043134, International Search Report and Written Opinion dated Dec. 14, 2022, consists of 17 pages.

(Continued)

*Primary Examiner* — Mohammed Alam
(74) *Attorney, Agent, or Firm* — Patterson + Sheridan, LLP

(57) ABSTRACT

Photonic integrated circuit (PIC) designs include various paths. During the design process, the properties of the paths of a PIC design are determined and used to analyze the PIC design. Determining the properties of a path includes receiving a PIC design including a plurality of devices. Further, a first path between a first pin of a first device of the plurality of devices and a second pin of a second device of the plurality of devices is determined. One or more properties of the first path are determined based on a wavelength of a light signal, a property of the first device, and a property of the second device. The first path and the one or more properties are output.

18 Claims, 14 Drawing Sheets

(56) References Cited

OTHER PUBLICATIONS

International Application No. PCT/US2022/043134, International Report on Patentability dated Mar. 21, 2024, consists of 10 pages.
European Application No. 22785840.4 Office Action dated Feb. 28, 2025.
European Application No. 22785840.4 Office Action dated Oct. 28, 2025.

* cited by examiner

```
# Initialize list of terminals we have seen
visitedTerms = empty list
Procedure getPaths (term1, term2) {
# Test whether the destination has been reached
  if term1==term2
    return list containing empty list
  # Initialize results to be empty
  results = empty list
  # Find the net connected to term1
  net1 = getConnectedNet (term1)

# Loop over all pins on that net (can be empty list)
  foreach pin connected to net1 {

# For this pin, go down a level of hierarchy if possible and
    # continue tracing.
    if pin in base level of hierarchy
      # If we are on the base level, nowhere to trace to
      continue

# Get the terminal connected to the pin in the lower level
    lowerTerm = getTermInLowerHierarchy (pin)
    # If we have seen the terminal in the lower level, continue
    # to next pin
    if lowerTerm in visitedTerms
      continue
    # Add term to list of visited terminals
    visitedTerms.append (lowerTerm)
    # Try tracing from here to the destination
    localPaths = getPaths (lowerTerm, term2)
    # If we got paths back, add them to the results list
    if localPaths != -1
      results.append(localPaths)
  }
```

*Fig. 7A*

```
# instterms are terminals connected to instances. Loop over all
# instterms on the net.
foreach instTerm connected to net1 {
  # If we saw it already, move on to the next
  if instTerm in visitedTerms
    continue
  # Mark the current term as visited
  visitedTerms.append(instTerm)
  # Find the instance connected to the instTerm
  inst = getInst (instTerm)
  # A leaf instance is one that has no higher hierarchy
  if isLeaf (inst){
    # Look at all instTerms connected to inst
    foreach instTerm2 attached to inst {
      # Only pass down allowed connections through this inst
      if inst.allowsConnection (instTerm, instTerm2) {
        if instTerm2 not in visitedTerms {
          visitedTerms.append(instTerm2)
          # Tracing from here should not influence tracing from
          # the next instTerm, so we have to back up the
          # visitedTerms
          backupVisitedTerms = visitedTerms
          # Trace from instTerm2 to the destination
          result = getPaths (instTerm2, term2)
          # And restore the visitedTerms
          visitedTerms = backupVisitedTerms
          if result != -1 {
            # Add the current inst in front of all returned
            # paths, and add them to the results list
            foreach path in result {
              path.prepend (inst)
              results.append (path)
            }
          }
        }
      }
    }
  }
}
```

*Fig. 7B*

```
else {
    # The inst has internal structure, so we have to dive down
    # into it. First find the internal pin connected to this
    # instTerm
    pin = getPinInHigherHierarchy (inst, instTerm)
    # Then the term connected to that pin
    term = getTerm (pin)
    # and trace from there to the destination
    paths = getPaths (term, term2)
    # Add returned paths to the results list
    if (paths != -1) results.append(paths)
  }
}
# Only return a list if there are results; else return -1
if results not empty
  return results
else return -1
}
```

Fig. 7C

OPTICAL PATH TRACING IN AN OPTICAL CIRCUIT DESIGN

RELATED APPLICATION

This application claims the benefit of U.S. provisional patent application Ser. No. 63/242,961, filed Sep. 10, 2021, which is hereby incorporated herein by reference.

TECHNICAL FIELD

The present disclosure relates to an optical device design system, and, more particularly, to a system and method for determining optical paths and the properties of the optical paths within an optical device design.

BACKGROUND

In photonic integrated circuits (PICs), light signals are used to communicate information. PICs are used within a photonic communication system to demultiplex telecommunication signals, process light detection and ranging (LiDAR) light signals, or process microwave signals. PICs are designed to reduce light loss (i.e., signal loss) during signal processing to improve the communication of information between devices. For examples, PICs may be designed to limit timing differences between signals of different channels (waveguides), or to delay signals by predetermined amounts such that errors within a received or transmitted signal are mitigated. Further, a PIC is designed to control the phase of a light signal during communication.

SUMMARY

In one example, a method includes receiving a photonic integrated circuit (PIC) design including a plurality of devices. Further, the method includes determining a first path between a first pin of a first device of the plurality of devices and a second pin of a second device of the plurality of devices. The method further includes determining one or more properties of the first path based on a wavelength of a light signal, a property of the first device, and a property of the second device, and outputting, by a processor, the first path and the one or more properties.

In one example, a system includes a memory storing instructions and a processor. The processor is coupled to the memory and executes the instructions to cause the processor to receive a photonic integrated circuit (PIC) design including a plurality of devices. The processor is further caused to determine a first path between a first pin of a first device of the plurality of devices and a second pin of a second device of the plurality of devices. Further, the processor is caused to determine one or more properties of the first path based on a wavelength of a light signal, a property of the first device, and a property of the second device, and outputting the first path and the one or more properties.

In one example, a computer implemented method for displaying properties of a photonic integrated circuit (PIC) design within a user interface includes receiving the PIC design that includes a plurality of devices. The plurality of devices includes a first device, a second device, and a third device. The third device is a hierarchical device including two or more levels of hierarchy. The method further includes determining a first path between a first pin of the first device and a second pin of the second device. The first path traverses the two or more levels of hierarchy of the third device. Further, the method includes determining one or more properties of the first path based on a wavelength of a light signal, the first device and the second device, and displaying the one or more properties within the user interface on a display device.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 7A, 7B, and 7C illustrate example pseudo code for determining a path of a PIC design, according to one or more examples.

DETAILED DESCRIPTION

Figure 1:
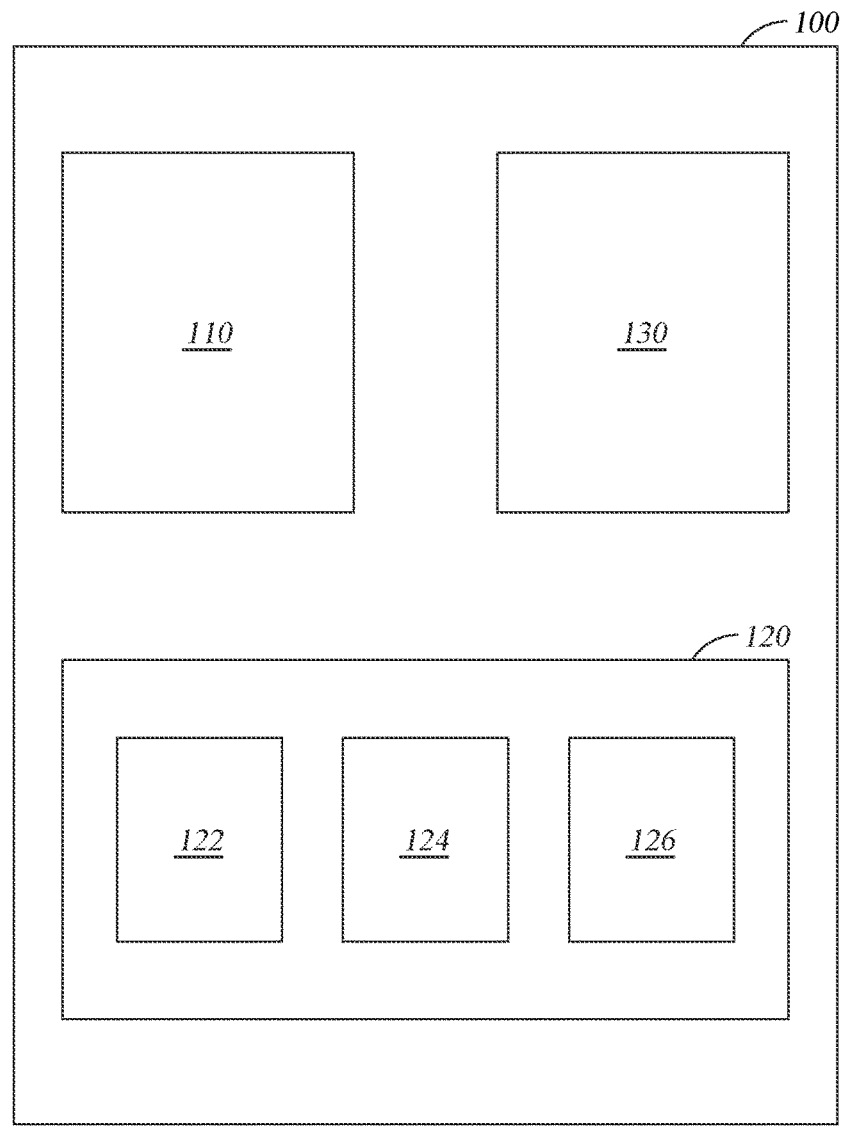
FIG. 1 illustrates a block diagraph of a photonic integrated circuit (PIC) design system, according to one or more examples.

Aspects of the present disclosure relate to optical path tracing in an optical circuit design. Photonic integrated circuits (PICs) are used in devices to transmit information via light signals (e.g., photonic signals). When designing PICs, the amount of information loss due to improper timing between signals (e.g., the arrival time of signals being different and/or the improper delay of a signal) may lead to errors within a transmitted and/or received light signal. Further, any errors within the phase of a light signal may lead to errors within a transmitted and/or received light signal.

A PIC design includes photonic devices connected to each other via optical paths, or paths. A path from an input to an output of the PIC design travels through one or more of the devices and one or more of the paths that connect the devices to each other. One or more devices of a PIC design may include one or more levels of hierarchy, hierarchical devices. In a PIC design that includes hierarchical devices, one or more paths of the PIC design may go through many levels of hierarchy.

During the PIC design process, the path that light travels through the PIC design and the devices along the path are used to determine the functionality of the PIC design. In a PIC design that includes hierarchical devices, each level of hierarchy in each hierarchical devices is explored to determine the path through the PIC design and each device that is along the path. However, the many levels of hierarchy in the different devices, increases the difficulty for a designer to manually identify the path within the PIC device and all of the devices along the path, increasing the probability that design errors may occur during the design process. Further, the optical properties (e.g., optical length, delay, and loss) depend on the parameters of the devices of a PIC design and the wavelength of the light signal. Accordingly, due to the high level of difficulty in identifying all of the devices within a PIC that a light signal passes through, the process of obtaining optical properties is cumbersome and error-prone. The present disclosure describes a design system and a design method that identifies the path, and corresponding devices, a light signal travels through within a PIC design, and the optical properties of the path. As will be described in greater detail in the following, a PIC design system obtains the path(s) between two optical nets with a PIC design, highlights the paths, identifies the corresponding devices and determines one or more properties of the path (e.g., the geometric or optical path length, optical delay, or optical loss). In one or more examples, performing such a process includes determining whether or not an identified path is correct and unique. Further, the properties of an identified path may be analyzed to determine if the identified properties fall within the parameters of the corresponding design. Additionally, path tracing and determination of the optical properties of multiple paths may be combined. The technical advantages of the present disclosure include, but are not limited to reducing the speed at which paths may be adjusted to meet the parameters of the corresponding design, freeing up computer resources to be used to design other devices and/or for other processes.

FIG. 1 is a block diagram of a PIC design system 100, according to one or more examples. The PIC design system 100 receives a PIC design schematic (e.g., a PIC design file), determines the path or paths that light travels through the devices of the PIC design schematic, and outputs the path or paths, as is described in the following in greater detail. The PIC design system 100 includes one or more processors (e.g., the processing device 1002 of FIG. 10) that executes instructions (e.g., instructions 1026 of FIG. 10) stored in a memory (e.g., the memory 120, the main memory 1004 of FIG. 10 and/or the machine-readable medium 1024 of FIG. 10) to receive the PIC design schematic, determine the paths that light travels within the PIC design schematic, and output the path or paths. In one example, the PIC design schematic is received from a memory (e.g., the memory 120) or another system. Further, the PIC design system 100 saves the determined paths within a memory (e.g., the memory 120) and/or outputs the determined paths to another system. The PIC design system 100 further identifies one or more properties of a PIC design based on the determined paths, devices determined to be along the paths, and a wavelength of light.

The PIC design system 100 includes a path tracer engine 110, the memory 120, and user interface 130. The path tracer engine 110 includes one or more processors (e.g., the processing device 1002 of FIG. 10) that executes instructions (e.g., instructions 1026 of FIG. 10) stored in a memory (e.g., the memory 120, the main memory 1004 of FIG. 10 and/or the machine-readable medium 1024 of FIG. 10) to receive a PIC design schematic, and analyzes the PIC design schematic to identify the paths within the PIC design schematic that light travels along. Further, the path tracer engine 110 determines and outputs a list of the devices and the corresponding input/output pins for the unique paths between nets of the PIC design schematic. As is described in greater detail in the following, in one or more examples, each path is queried to determine a geometrical length, an optical length, an optical delay, and/or an optical loss. The paths may be stored within a memory (e.g., the memory 120). In one or more example, the paths are highlighted, or identified in some other way, within in a schematic editor of the user interface 130 and displayed on a display device (e.g., video display unit 1010 of FIG. 10). In one example, a user may select, via an input device (e.g., the alphanumeric input device 1012 of FIG. 10 and/or the cursor control device 1014 of FIG. 10), source and destination nets within the user interface 130. Based on the selection of the source and destination nets, the details of an optical path or paths and the corresponding optical properties is output via the user interface 130 on a display device (e.g., video display unit 1010 of FIG. 10).

Figure 10:
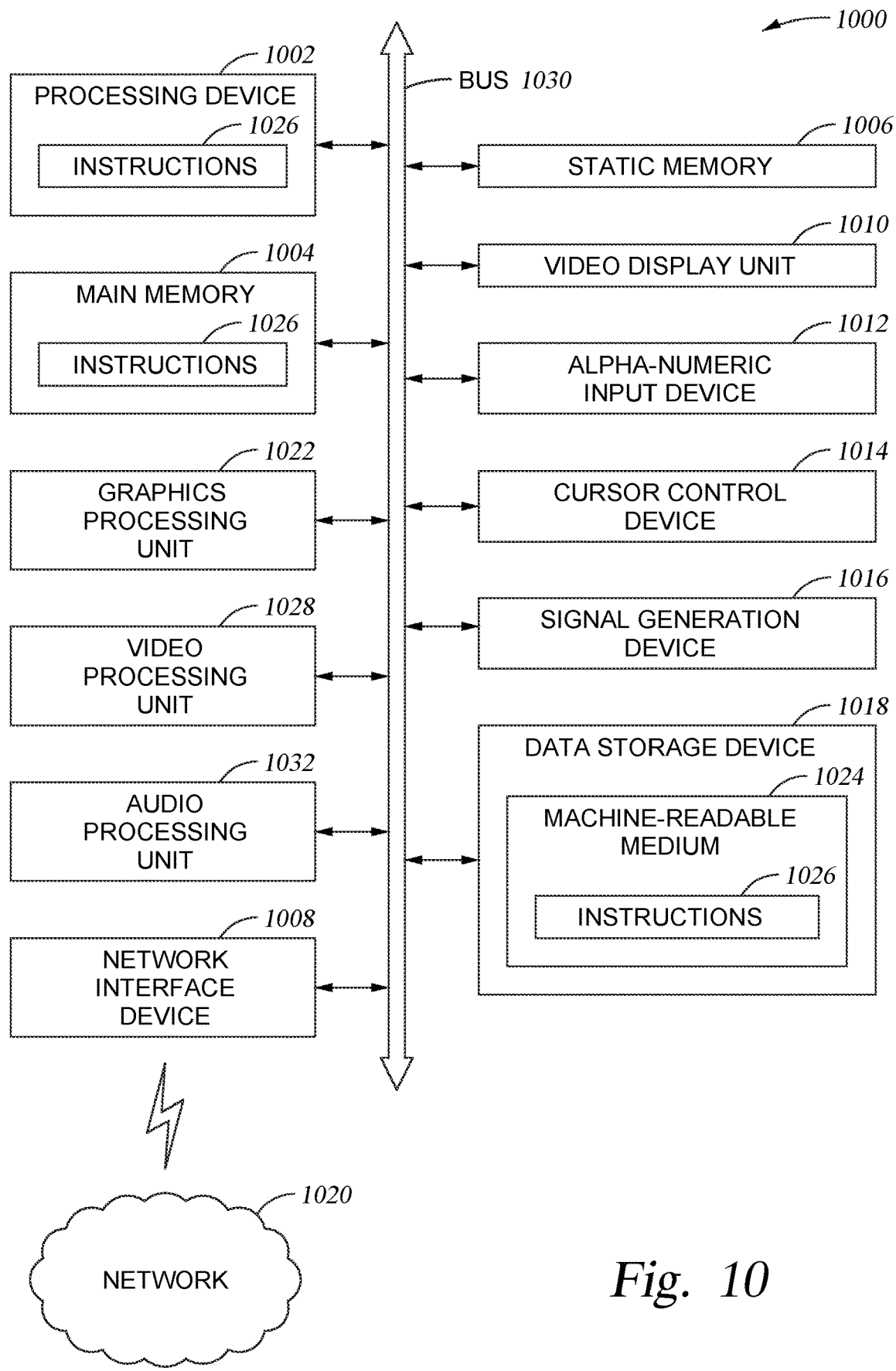
FIG. 10 depicts a diagram of an example computer system in which embodiments of the present disclosure may operate.

The memory 120 is configured similar to the main memory 1004 of FIG. 10 and/or the machine-readable medium 1024 of FIG. 10. The memory 120 includes a process design kit (PDK) 122 and a design database 124 stored therein. The PDK 122 and the design database 124 are accessible by the path tracer engine 110. In one or more examples, a PIC design 126 is stored within the memory 120.

The PDK 122 stores device properties for each of the devices that may be used within a PIC or other electronic device. In one example, the devices may include photonic devices. For example, the photonic devices include waveguides, filters, splitters, and mixers, among others. The device properties of the PDK 122 define the input pins of a device, the output pins of a device, which pins are connected to each other within a device, and a path length between pins of a device, among others. In one or more examples, the PDK 122 is a file that includes information corresponding to which specific pins of a device (e.g., component) of a PIC design schematic transmit a light signal when a light signal is received by a particular pin of the device. In one example, a device includes multiple input pins and multiple output pins.

The PDK 122 can be used to determine which of the output pins output a light signal when the light signal is received by a particular pin of the multiple input pins. In various examples, the information related to which output pin outputs a light signal when a particular input pin receives a light signal may be utilized by the path tracer engine 110 to determine the path at which a light signal travels through a corresponding PIC design schematic.

Further, in one or more examples, the PDK 122 includes models that describe the geometrical and/or optical length or each device of a PIC design schematic (e.g., the PIC design 126). As will be described in greater detail in the following, the path tracer engine 110 uses the PDK 122 to determine the properties of light paths within a PIC design schematic (e.g., the PIC design 126). The properties may be functions of the wavelength of a light signal. In one or more examples, the models of the PDK 122 describe the time delay of light signals and the power loss of the light signals as the light signal travels from one pin of the devices to another pin of the devices. The geometrical length is related to the physical length along the path. The optical length is the integrated effective index along the path. Further, the optical length describes the phase of the light signal based on the formula "phase=2*pi/wavelength*optical length".

As will be described in greater detail in the following, the path tracer engine 110 uses the PDK 122 to identify the paths within a PIC design that a light signal travels and the properties of the paths.

The design database 124 provides the functional information of each device within a PIC device. For example, for a PIC design, the design database 124 includes functions of the devices with regard to photonic devices, e.g., waveguides, filters, splitters, and mixers, among others. In other example, the design database 124 includes functional information related to the devices of other types of IC circuit designs. For example, the design database 124 may include functional information related to multipliers, adders, buffers, inverters, multiplexers, latches, flip-flops, and gate logic, among others.

The user interface 130 displays one or more properties of a PIC design determined by path tracer engine 110. Is one or more examples, the user interface 130 is configured similar to the graphics processing unit 1022 of FIG. 10. For example, the user interface 130 illustrates the number of identified paths and corresponding properties (e.g., geometrical length, optical length, and/or delay, among others) of a PIC design. In one example, the user interface 130 allows for a user to identify a starting device and a destination device of a PIC design. The user interface 130 is displayed on a display device (e.g., the video display unit 1010 of FIG. 10), and receives input from one or more input devices (e.g., alpha-numeric input device 1012 of FIG. 10 and/or cursor control device 1014 of FIG. 10). In one or more examples, a PIC design includes a bus (e.g., a bus net or net bundles). In such an example, the bus includes multiple signal paths. A user may select a bit, or signal, to be analyzed by the path trace engine 110 via the user interface 130.

Figure 2:
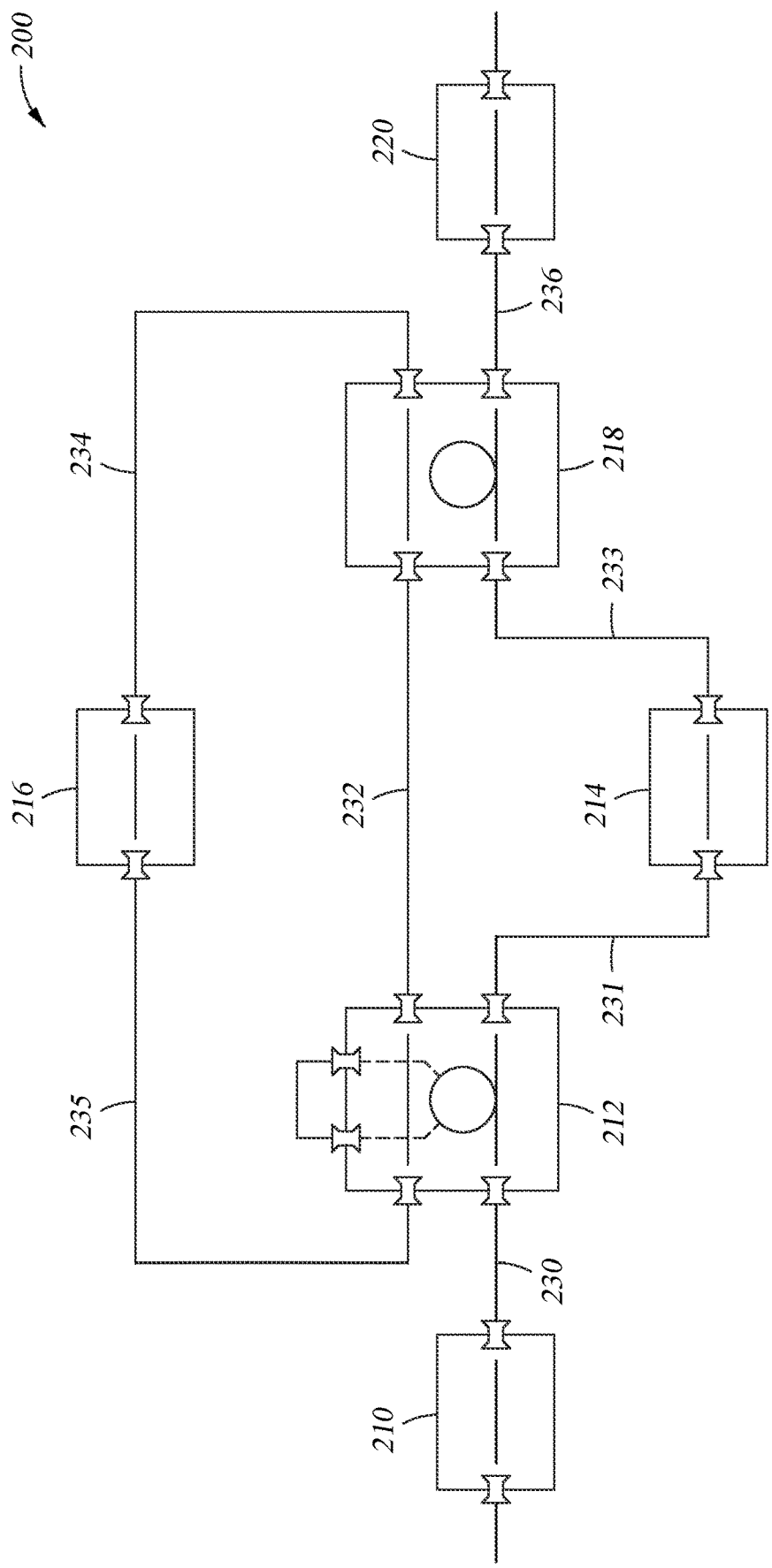
FIG. 2 illustrates a block diagram of schematic of a PIC design, according to one or more examples.

FIG. 2 illustrates a schematic diagram of a PIC design 200, according to one or more examples. The PIC design 200 includes photonic devices. In one example, the PIC design 200 may also include one or more electronic elements (e.g., devices or components). Further, while FIG. 2 is a schematic diagram for a PIC design 200, in other examples, the schematic diagram may be for other types of electronic ICs. The PIC design 200 includes devices interconnected via paths. For example, the PIC design 200 includes photonic devices, or devices, 210-220 and paths 230-236 that form nets. A net connects two or more of the devices 210-220 and is represented by the wires that connect the photonic devices. Each of the devices 210-220 may be referred to as an instance. A PIC device may include multiple instances of the same device type. Each of the devices (e.g., instances) includes one or more input pins (e.g., input terminals), and one or more output pins (e.g., output terminals). The number of input pins for a device 210-220 may be greater than, less than, or equal to the number of output pins. The input and output pins of the PIC design 200 are photonic pins. In one or more examples, one or more of the input and output pins are electrical pins. Each of the devices 210-220 may be referred to as a sub-cell of the PIC design 200.

The PIC design 200 includes nets 230-236. The nets 230-236 are the interconnects between the devices 210-220. In the PIC design 200, the devices 210-218 have input and output pins that are connected by nets 230-236. The nets 230-236 identify which pins of the devices are physically connected to each other.

In the PIC design 200, the devices 210 and 212 are connected via the net 230, the devices 212 and 214 are connected via the net 231, the devices 214 and 218 are connected via the net 233, the devices 212 and 218 are connected via the net 232, the devices 218 and 216 are connected via the net 234, the devices 216 and 212 are connected via the net 235, and the devices 218 and 220 are connected via the net 236.

In one or more examples, one or more of the devices 210-220 are single, non-hierarchical cells (e.g., a leaf cell) within the design database 124. Additionally, or alternatively, one or more of the devices 210-218 is a hierarchical device. A hierarchical device includes one or more levels of hierarchy. Each level of hierarchy includes corresponding devices and paths.

In one or more examples, depending on the function of the devices 210-220, a light signal received by one pin of a device may be output by the device through one or more other pins, or completely absorbed inside the device. In one example, the function of the devices 210-220 is defined by the design database 124.

In one example, inside each device 210-220, the physical implementation of the paths between the input and output (receiving and transmitting) pins of the devices 210-220 is associated with the geometrical and optical properties of the devices 210-220. In one or more examples, the geometrical and optical properties are unique to each device.

In one example, light signal is able to exit a device through more than one output pin of a device (e.g., the devices 210-220). Accordingly, the path the light signal takes from one device to another is not necessarily unique. A unique path is a path that differs in at least one of an input pin, an output pin, different devices, order of devices, among others, from the other paths. For example, a first path and a second path between a first and second devices may be determined to be unique if the first path and the second path include a different input pin of a device, output pin of a device, a different intermediate device, and/or a different order of devices between the first and second devices. As illustrated in FIG. 2, each of the paths through nets and devices (210, 230, 212, 231, 214, 233, 218, 236, and 220) and (210, 230, 212, 235, 216, 234, 218, 236, and 220) are unique paths from left to right. A path is determined to be a non-unique path if the path is identical to another path. In one or more examples, identical paths between a first device and a second device have the same input and output pins and include the same order of and intermediate devices. In one example, the path may branch out (e.g., split into multiple paths) and rejoin through input pins of a single device. Such paths may be determined to be unique if each path includes different devices, input pins, and/or output pins. Further, paths may contain feedback loops, in which the light signal may travel in cycles. In the following, only the first loop is counted as a unique path.

In one more example, a schematic of a PIC design includes one or more hierarchical components. In such an example, one or more components (e.g., one or more symbols) within the schematic contains a hierarchical design. Accordingly, to determine the path from a first device to a second device, each of the levels of hierarchy are traced through to find all possible paths.

Figure 3:
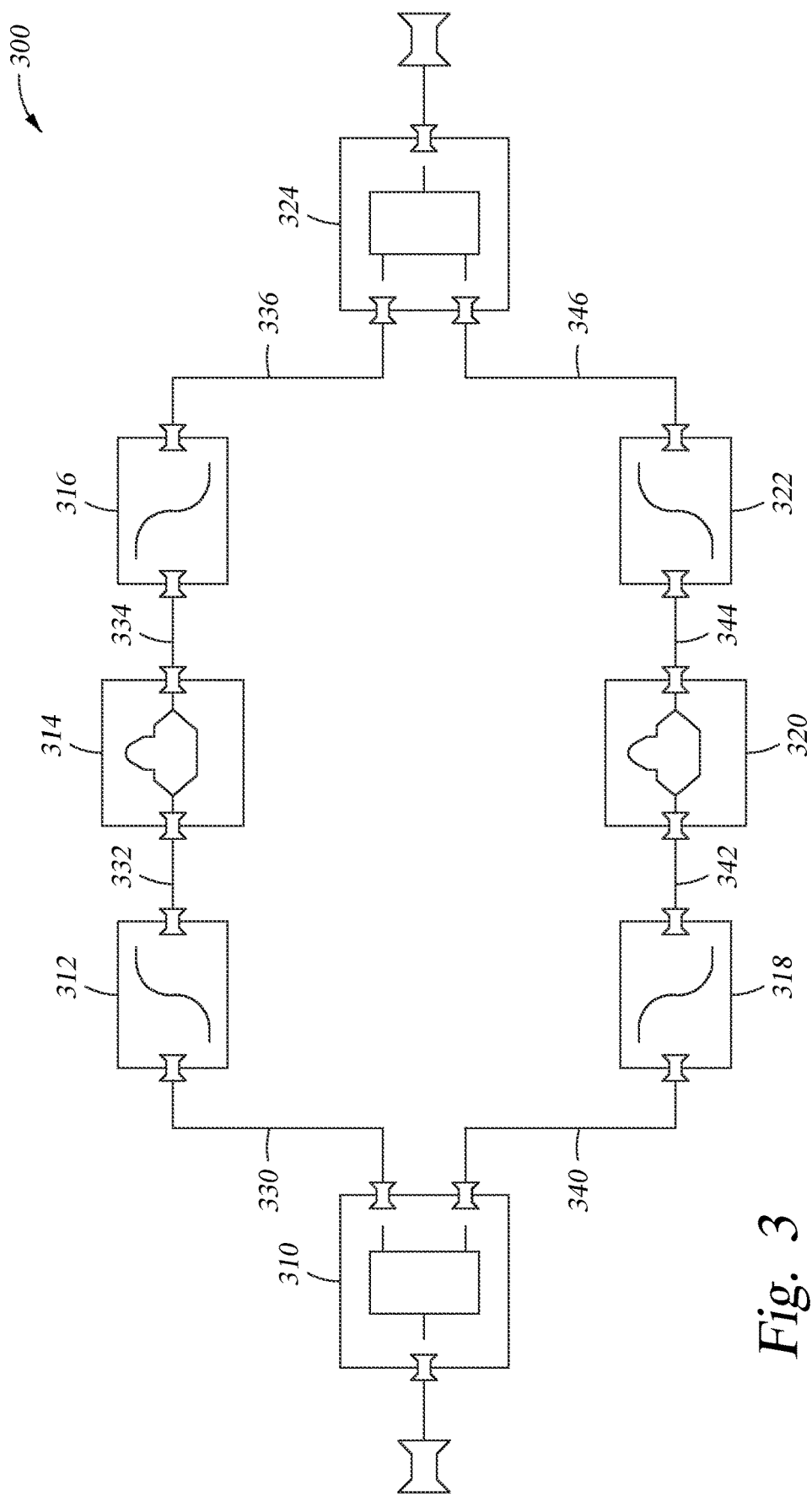
FIG. 3 illustrates a block diagram of a schematic of a PIC design, according to one or more examples.

FIG. 3 illustrates a schematic of a PIC design 300 having a hierarchical design. The PIC design 300 includes devices 310, 312, 314, 318, 320, 322, and 324. One or more of the devices 310, 312, 314, 316, 318, 320, 322, and 324 are hierarchical devices. A hierarchical device includes one or more levels of hierarchy. In one example, device 314 is a hierarchical device having a design such as illustrated by the PIC design 200 of FIG. 2. Accordingly, to determine each of the devices of the path between the devices 310 and 320, and corresponding connected pins, each level of the hierarchy of the device 314 is expanded and analyzed. A path is determined for each level of hierarchy. In one example, each level of the hierarchy is expanded and a path through the lowest level of hierarchy is determined first, before the path is determined for the next level of hierarchy. The path and list of devices of devices for each level of hierarchy is output (e.g., stored in the memory 120 or displayed within the user interface 130).

As illustrated in FIG. 3, a first path between the devices 310 and 324 includes the device 310 connected to the device 312 via the net 330, the device 312 connected to the device 314 via the net 332, the device 314 connected to the device 316 via the net 334, and the device 316 connected to the device 324 via the net 336. As illustrated in FIG. 3, a second path between the devices 310 and 324 includes the device 310 connected to the device 318 via the net 340, the device 318 connected to the device 320 via the net 342, the device 320 connected to the device 322 via the net 344, and the device 322 connected to the device 324 via the net 346.

The first path and the second path between the devices 310 and 324 differ in at least one of a number of devices between the devices 310 and 324, the set of devices between the devices 310 and 324, and/or the order of devices between the devices 310 and 320. For example, the first path between the device 310 and the second device 324 includes the device 312, and the second path between the device 310 and the second device 324 includes the device 318 that differs from the device 312. However, due to the hierarchy that exists in devices 314 and 320, more unique paths exist between devices 310 and 324.

Figure 4:
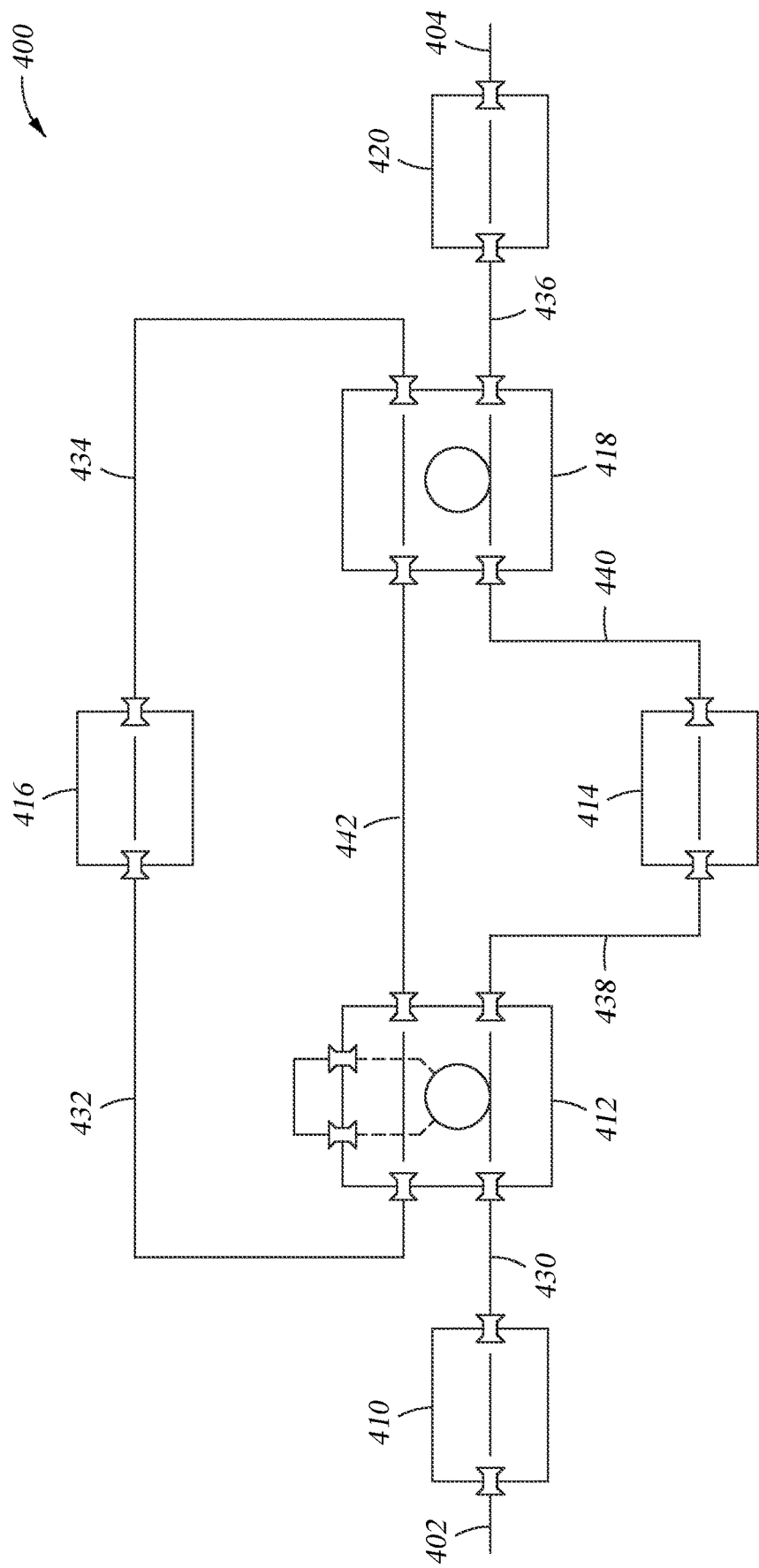
FIG. 4 illustrates a block diagram of a schematic of a level of hierarchy of a device of a PIC design, according to one or more examples.

FIG. 4 illustrates a schematic 400 of the expanded hierarchy of the device 314 and the device 320. In the schematic 400, the expanded hierarchy of the device 314 and the device 320 includes devices 410, 412, 414, 416, 418, and 420. The paths from the input 402 to the output 404 are determined by the path tracer engine 110 of FIG. 1 based on device properties within the PDK 122 of FIG. 1. In the example of FIG. 4, the paths from the input 402 to the output 404 are determined to be twofold: one path includes the net 430 connecting device 410 with the device 412, the net 432 connecting device 412 with the device 416, the net 434 connecting the device 416 to the device 418, and the net 436 connecting the device 418 and the device 420; and the other path includes the net 430 connecting device 410 with the device 412, the net 438 connecting device 412 with the device 414, the net 440 connecting the device 414 to the device 418, and the net 436 connecting the device 418 and the device 420. The paths through the hierarchy of the device 400 are determined based on the PDK 122.

In one or more examples, as there are two paths through each of the device 314 and the device 320, the total number of unique paths from the device 310 to the device 324 is four.

In one example, a path between devices 410 and 420 may include other devices and nets than that described above. For example, the path between devices 410 and 420 may include devices 412, 416, 418, 414, and 418, and nets 430, 432, 434, 436, 438, 440, and 442. In such an example, the path travels along nets 430, 432, 434, and 442 and corresponding devices before proceeding along nets 438, 440, and 436 and corresponding devices.

Figure 5:
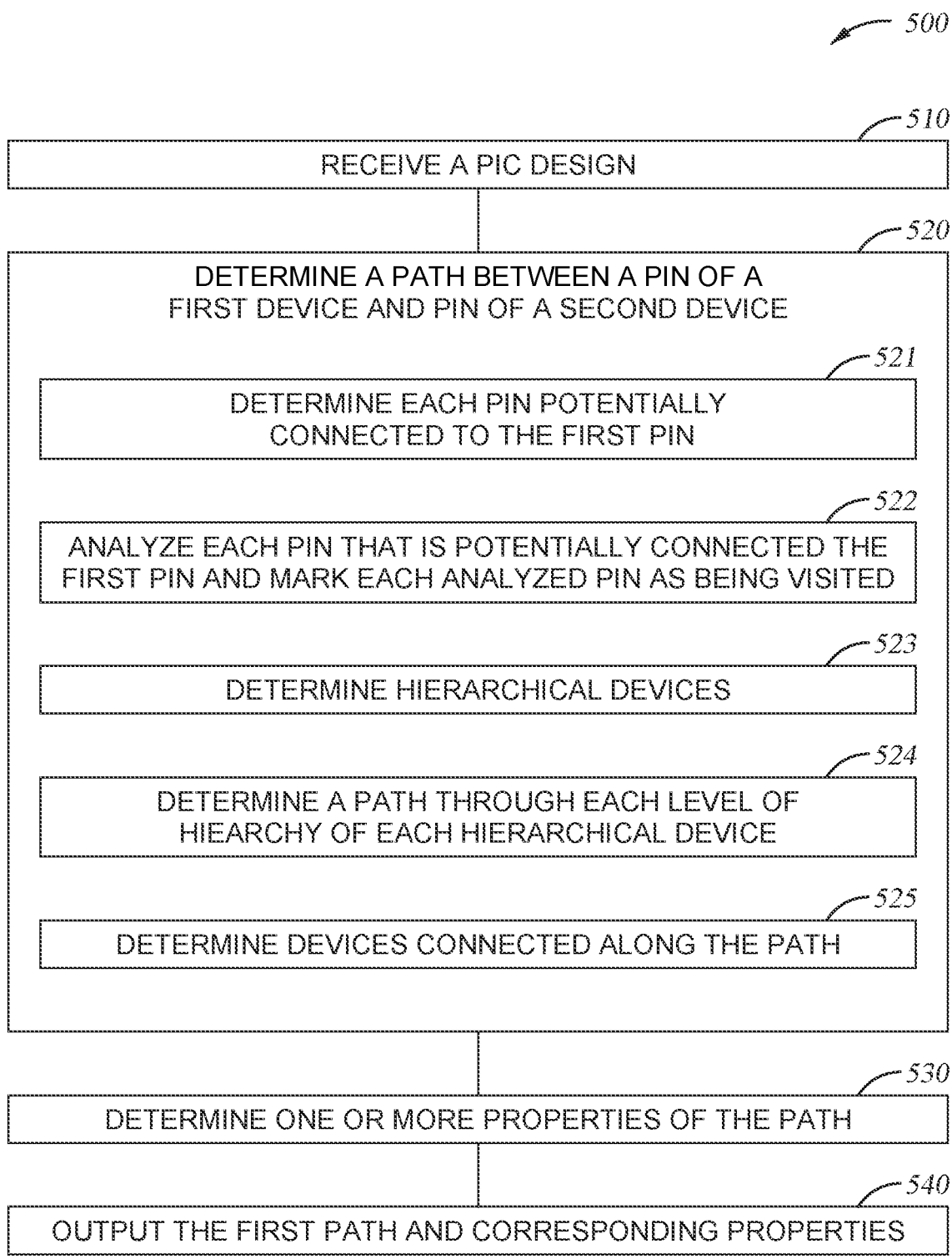
FIG. 5 illustrates a flowchart for determining a path of a PIC design, according to one or more examples.

FIG. 5 illustrates a flowchart for determining a path of a PIC design, devices along the path, and properties of the path, according to one or more examples. A method 500 may be performed by the PIC design system 100. For example, one or more processors of the PIC design system 100 executes instructions stored in the memory to perform the method 500. In one example, the method 500 is performed as part of layout or physical implementation 924 of FIG. 9.

At 510 of the method 500, a PIC design is received. In one example, the PIC design 126 of the FIG. 1 is received by path tracer engine 110 of FIG. 1. The PIC design 126 may be configured similar to the PIC design 200 of FIG. 2, or the PIC design 300 of FIG. 3. In other examples, the path tracer engine 110 receives a PIC design from a system external to the PIC design system 100 or another engine within the PIC design system 100.

At 520, a path between a pin of a first device and a pin of a second device is determined. In one example, with reference to FIG. 1 and FIG. 3, the path tracer engine 110 determines the path between a pin of the device 310 and a pin of the device 312. Determining the path between the pin of the device 310 and the device 312 is part of the process of determining a path (e.g., the path 330) from the device 310 to the device 324. The device 310 may be referred to as the source device and the device 324 may be referred to as the destination device. In one example, the devices 310 and 324 are indicated as being the source devices and the destination devices via the user interface 130. The path tracer engine 110 obtains the devices 310 and 324 as being the source and destination devices from the memory 120.

The path tracer engine 110 determines that the net 330 connects an output pin of the device 310 with an input pin of the device 312, and the connections between input and output pins of each of the devices 310 and 312 based on properties within the PDK 122 of FIG. 1. In one example, the path tracer engine 110 obtains details regarding the path of light within each of the devices 310 and 312 to determine the input and output pins associated with the net 330. The properties of each of the devices within the PDK 122 are used by the path tracer engine 110 to determine the connected input and output pins of each of the devices 310 and 312. The properties of the PDK 122 identify the connections between the input and output pins within each of the devices 310 and 312. The properties within the PDK 122 are used by the path tracer engine 110 to determine which input pin of a device is connected which output pin of the device. In one example, an output pin of the device 310 is connected to an input pin of the device 312 via the net 330. In such an example, the path tracer engine 110 determines which input pin of the device 310 is connected to the output pin of the device 310 based on the properties within the PDK 122. Further, the path tracer engine 110 determine which output pin of the device 312 is connected to the input of the path tracer engine 110 based on the properties within the PDK 122. Similarly, the path tracer engine 110 determines the input and output pins of the devices associated with the nets 332, 334, and 336 based on the properties within the PDK 122 for each of the devices 312, 314, 316, and 324. The nets 330, 332, 334, and 336 form a first path from the device 310 to the device 324. The first path further includes the paths within the levels of hierarchy of the devices 310, 312, 314, 316, and 324. For example, the path between the device 310 to the device 324 includes the paths connecting the device 410 with the device 420 of FIG. 4

In one or more examples, the path tracer engine 110 determines that the device 310 is connected to the device 318 via the net 340, the device 318 is connected to the device 320 via the net 342, the device 320 is connected to the device 322 via the net 344, and the device 322 is connected to the device 324 via the net 346. The nets 340, 342, 344, and 346 form a second path between the devices 310 and 324. While the device 310 is illustrated in FIG. 3 as being connected to the device 324 via two paths, in other examples, the device 310 is connected to the device 324 by more than two paths. In one or more examples, multiple paths may be presented between any two adjacent devices, forming multiple devices between a source device and a destination device.

In one example, the device properties of the PDK 122 indicates that the input pin of device 310 is connected to one or more of the output pins of the device 310. Based on the device properties for the device 310 within the PDK 122, the path tracer engine 110 determines that an input pin of the device 310 is connected to a first output pin of the device 310. Accordingly, a light signal received at an input pin of device 310 is output along the net 330 from an output pin of the device 310. In one example, based on the device properties stored within the PDK 122, the path tracer engine 110 determines which pins of each device are the output pins reachable from any input pins to determine the possible paths between devices within the corresponding PIC design. The path tracer engine 110 accesses the PDK 122 and the design database 124 to analyze each device and to determine the paths within devices and between devices.

In one or more examples, the path tracer engine 110 performs a recursive procedure to determine the path between devices of a PIC design (e.g., the PIC design 300 of FIG. 3). For example, when determining the path from the device 310, the path tracer engine 110 performs 521 to determine each candidate pin of each device (e.g., 310-324) that could be connected to the pin (e.g., the first pin) of the device 310. In one example, for a first pin of the device 310 of FIG. 3, the path tracer engine 110 queries the PDK 122 to determine which pins can be reached from the pin. For example, the path tracer engine 110 determines which pins of devices 310-324 can be connected to the first pin.

At 522, the path tracer engine 110 analyzes each pin that could be connected to the pin of the device 310 (e.g., the first pin) to determine whether or not each pin is connected to the pin of the device 310, and indicates (e.g., marks) each analyzed pin as being visited. Analyzing a pin includes determining whether or not a net connects the pin to the pin of the device 310. A visited pin is a pin that has been identified by the path tracer engine 110. Further, once a visited pin is identified for a second time, the path tracer engine 110 stops tracing that particular path. Accordingly, a loop, or portion of a path, may not be reported more than once.

One by one, the path tracer engine 110 marks each analyzed pin of each device connected to the device 310 as 'visited', and identifies the pin of the next device (e.g., the device 312 of FIG. 3) connected to the pin of the device 310. The device 310 may be referred to as the device under examination. In an example where the device 310 is under examination, a pin of the device 312 is identified as being connected to a pin of the device 310 if a path connecting the pins of the devices is determined to exist. The path tracer engine 110 analyzes the pin of the device 310 and the pin of the device 312 to determine if the pins are connected. The pins of the device 310 and the device 312 are determined to be connected when the devices 310 and 210 are determined to be on the same net based on the design database 124.

In one example, determining a path between a pin of a first device and a pin of a second device includes at 523, determining devices that are hierarchical devices. In one or more examples, the path tracer engine 110 performs path tracing by a form of depth-first search using the design database 124 of FIG. 1. The design database 124 of FIG. 1 describes the hierarchical properties of each device of a PIC design (e.g., the PIC design 300). The path tracer engine 110 uses the hierarchical properties of the design database 124 to determine which of the devices 310-324 are hierarchical devices and the path through those devices at each level of hierarchy based on the design database 124. In one example, for each device determined to be a hierarchical device, each level of hierarchy within the device is expanded to determine a corresponding path and devices along the path.

At 524, a path through each level of hierarchy of each hierarchical device is determined. For example, based on a determination that a device (e.g., the device 314) is connected to the pin being analyzed has hierarchy, the hierarchy is opened and each level of the hierarchy and corresponding devices are analyzed to determine the path through each level of the hierarchy of the hierarchical device. The path tracing procedure then follows from the output of that device. In one example, the path tracer engine 110 analyzes each of the devices with a PIC design that includes hierarchical information to determine which of the device include additional layers (e.g., levels) of hierarchy. In one example, if the current pin is determined by the path tracer engine 110 to be connected to an external pin of a level of hierarchy, the path tracing process either terminates (if this pin is in the base level of hierarchy of the design) or continues on the corresponding net in next (e.g., higher) level of hierarchy.

In one example, when analyzing a next output pin of a device within a level of hierarchy of a device, the set of visited pins is reset to the state when entering the hierarchical device or another layer of hierarchy within the hierarchical device. Further, each pin from which the destination net is reachable returns a set of all possible paths. All paths from all output pins are collected in a set and returned.

At 525, the devices along the path are determined and added to a list (result list). The result list is stored in a memory, e.g., the memory 120 of FIG. 1. The devices include the devices along the path at each level of hierarchy within each hierarchical device. In one example, the output pins of the current device under examination (e.g., the device 310) are analyzed to determine connections to input pins of other devices. This process is completed until a connection between an output pin of a first device (e.g., the device 310) and an input pin of a second device (e.g., the device 324) is reached. The process ends when the destination device, or destination net, is reached. Each device determined to be connected along the path from the first device to the second device are added to a list, or results list. With reference to FIG. 3, the devices 312, 314, and 316 are determined to be along the path from the device 310 to the device 324. Further, the devices 410, 412, 416, 418, and 420 of the hierarchical device 314 are determined to be along the path and added the result list.

At 530, one or more properties of the path are determined. For example, the path tracer engine 110 determines a geometrical length and/or an optical length based on the models within the PDK 122 and/or the device functions of the design database 124. In one example, the path tracer engine 110 determines the optical length further based on a wavelength of the light signal. The wavelength is obtained from the memory 120. In one example, the wavelength is provided via the user interface 130. Further, the path tracer engine 110 determines the properties of the path based on properties of the devices within the path. For example, models within the PDK 122 associated with the devices within the path are selected. As is noted above, the models of the PDK 122 describes properties (e.g., geometrical and/or optical length) of each of the devices. A delay, a geometrical length, and/or optical length of the path is determined based on the models of the PDK 122 and the wavelength.

At 540 of the method 500, the path and corresponding properties are output. For example, the path and corresponding properties are output via the user interface 130 and displayed on a display. In another example, the path and corresponding properties are stored within the memory 120.

Figure 6A:
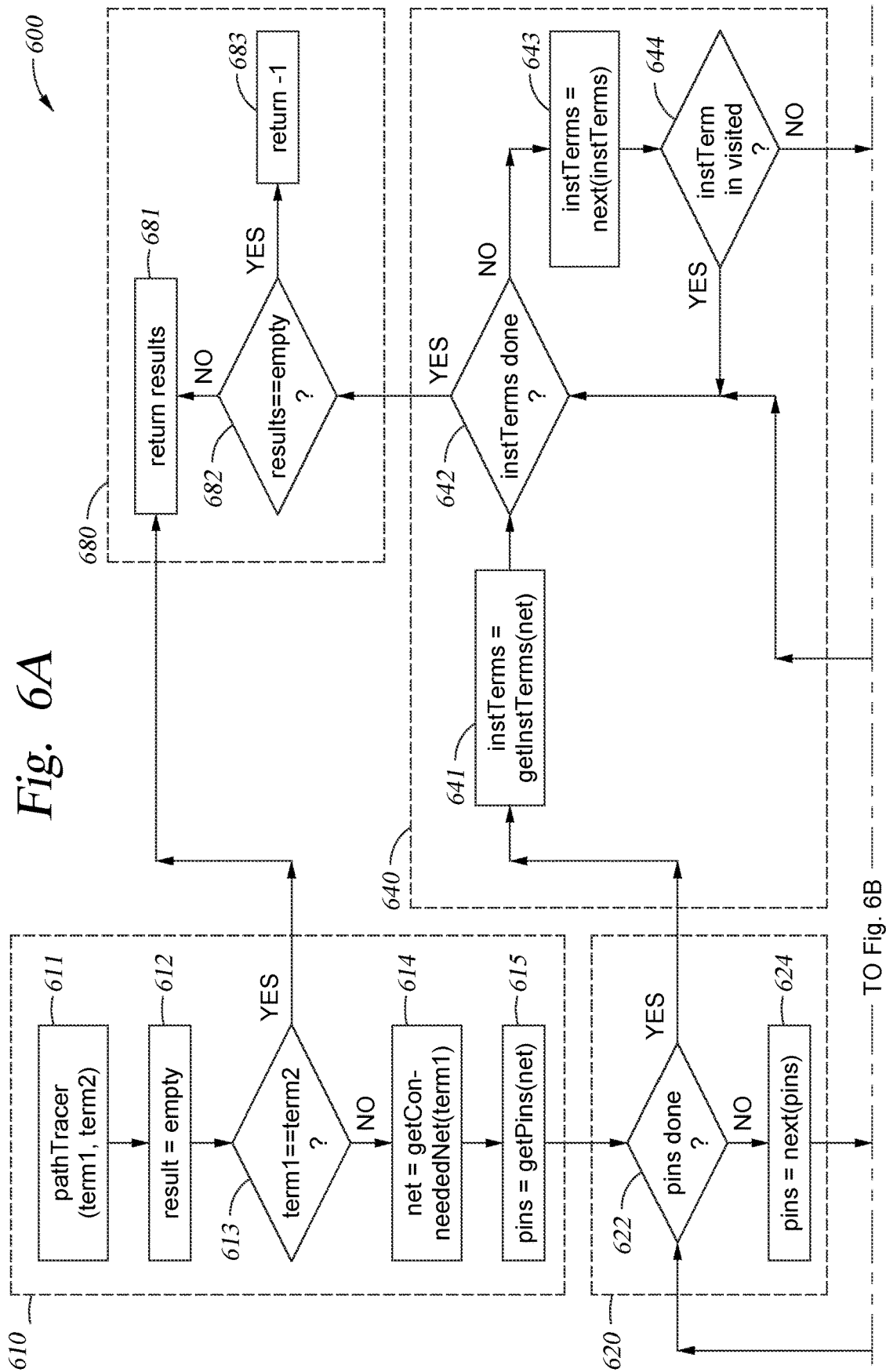
FIGS. 6A, 6B, and 6C illustrate another a flowchart of a method for determining a path of a PIC design, according to one or more examples.
Figure 6B:
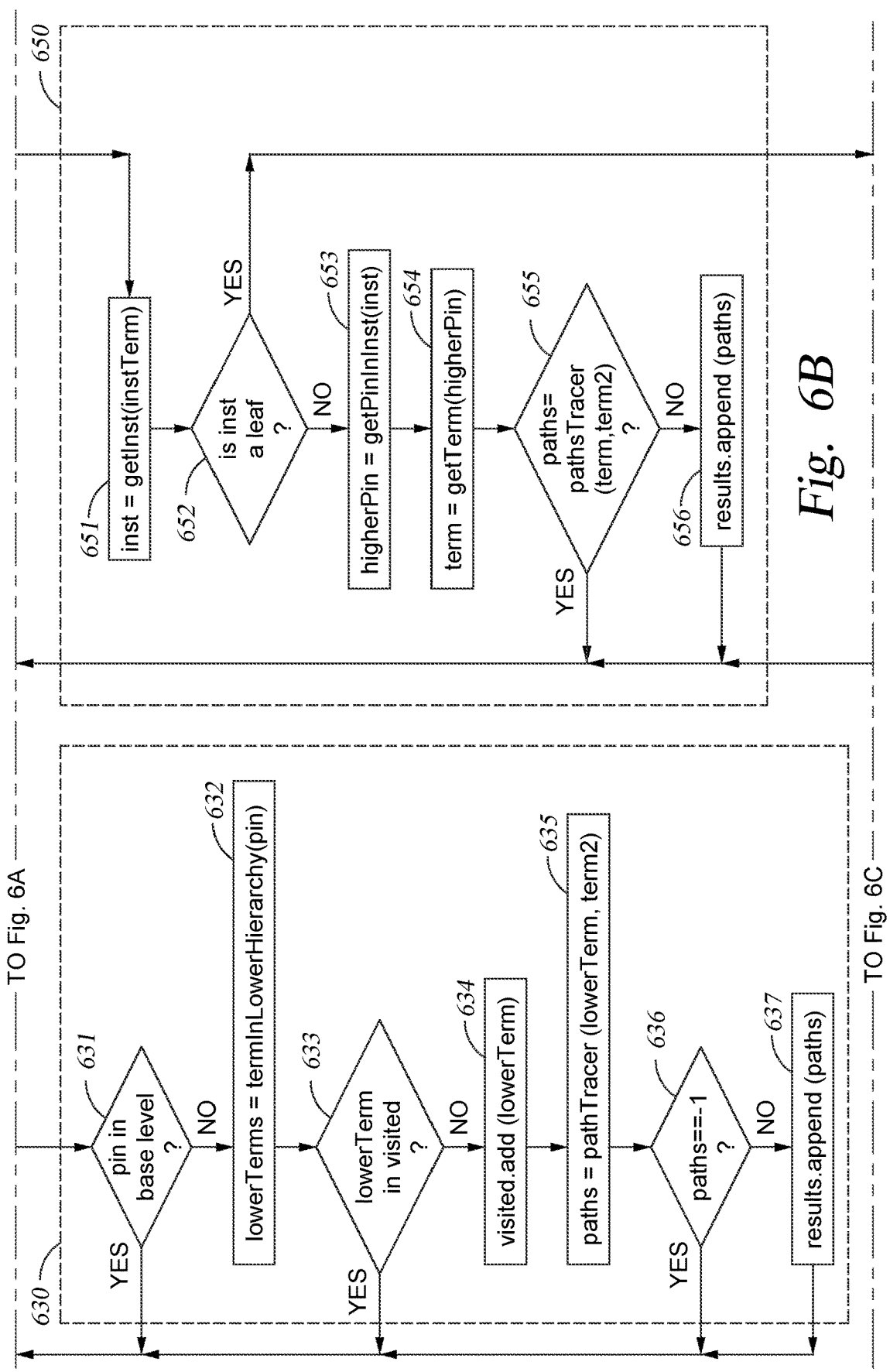
Figure 6C:
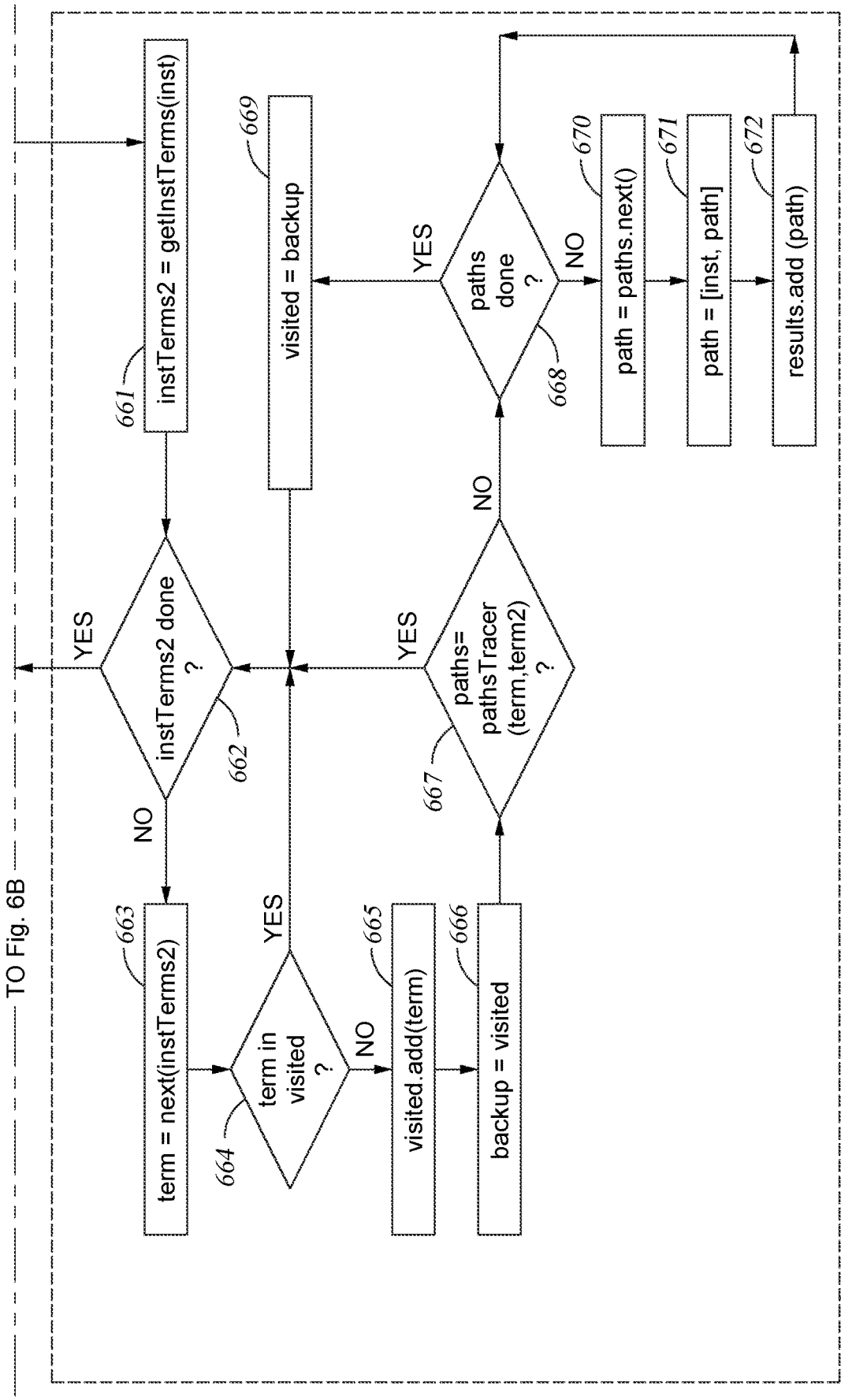

FIGS. 6A, 6B, and 6C illustrate another flowchart for determining a path between devices of a schematic of a PIC design. A method 600 is performed by the PIC design system 100 of FIG. 1 or another design system configured to design PIC devices. For example, one or more processors of the PIC design system 100 executes instructions stored in a memory to perform the method 600. In one example, the method 600 is performed as part of layout or physical implementation 924 of FIG. 9.

With further reference to FIG. 6A, at 610, a recursive procedure is defined that will return all paths from a first pin or terminal (e.g., term1) of a first device to a second pin or terminal (e.g., term2) of a second device. The recursive procedure of 610 of the method 600 includes 611. At 611, the first and second terminals (e.g., term1, term2) are defined for path tracing to be performed by the path tracer engine 110. Further, the recursive procedure of 610 includes setting the result list (e.g., results) to an empty list (e.g., the results are reset to a known quantity), at 612. The result list corresponds to the results of the paths found during the path tracing process. At 613, a determination as to whether or not the first terminal (term1) is equal to the second terminal (term2) is made. In one example, the path tracer engine 110 makes the determination as to whether or not the first terminal is equal to the second terminal. At 614, based on a determination that the first terminal is not equal to the second terminal, the path tracer engine 110 identifies the net to be analyzed as the net connected to the first terminal. A net corresponds to a wires (e.g., connections) between terminals of two devices within a PIC design. Further, at 615, pins within the net are selected by the path tracer engine 110. The pins are the boundaries of hierarchies of the first and second devices. If, at 613, the first terminal is determined to be equal to the second terminal, an empty list is returned at 680.

At 620, a determination as to whether each of the pins of the current net have been visited is made (e.g., at 622). If all the pins of the current net have not been visited, a next pin (e.g., a non-analyzed pin) of the current net is selected (e.g., at 624) and visited at 630. Based on a determination that all pins of the current net have been analyzed at 620, the method 600 proceeds to 640 of the method 600.

At 630, a determination as to whether the current level of hierarchy is at the base level is made. If the current level is determined to be at the base level of hierarchy of a device, the analysis of currently selected pin is determined to be completed, and the method 600 returns to 620. If the current hierarchy level is determined to not be at the base level of hierarchy of the device being analyzed, each higher level of hierarchy is subsequently analyzed to determine the path through each level of hierarchy until the top level of hierarchy is reached or one or more paths to the second terminal (or destination term) are found.

In one example, 630 includes at 631, a determination as to whether or not the selected pin is in the base level of the hierarchy of the selected device is made. If at 631, the selected pin is determined to be in the base level of the hierarchy of the selected device, the method 600 returns to 620. If at 631, the pin is determined to not be in the base level of the hierarchy of the device, a pin (e.g., terminal) in a lower level (e.g., layer) of the hierarchy is selected at 632. In one or more examples, a pin in a lower subsequent level of the hierarchy is selected until a determination that the current level is the base level. At 633 of the method 600, a determination as to whether or not the selected pin in the lower level of hierarchy has been visited is made. If at 633, the selected pin is determined to have been visited, the method 600 returns to 620. If at 633, the selected pin is determined to have been visited, the selected pin is added to the list of visited pins (e.g., terminals) at 634. Adding the selected pin to the list of visited pins may include indicating the selected pin as being a visited pin. At 635, a path is determined between the selected pin (lowerTerm) and the second pin (term2). At 636 of the method 600, a determination as to whether or not a path is detected between the selected pin (lowerTerm) and the second pin (term2) is made. If at 636, a path between the selected pin (lowerTerm) and the second pin (term2) is detected (e.g., the path does not equal −1, or associated with another indication that the path between the selected pin and the second pin is detected), the path is added to the result list at 637 and stored in the memory 120. The method 600 returns to 620 after 636. If at 636, a path between the selected pin (lowerTerm) and the second pin (term2) is not detected (e.g., the path equals −1), the method 600 returns to 620.

If at 620, each of the pins of the currently selected net are determined to have been analyzed, the method 600 proceeds to 640. At block 640, a determination as to whether the current net is connected to one or more pins (or instance terminals) of an instance of a device within the PIC design (e.g., instTerms) is made. In one example, terminals are the logical connection points for a block representing an instance of a device. The pins associated with the terminals represent the physical connection points. In one example, the nets associated with the terminals are logically exported through the terminals to the next higher level in design hierarchy. In an example where multiple physical connects can correspond to one logical connection, a terminal can have multiple pins. An instance terminal represents the connection between a net and a terminal in the design of the instance. For each instance terminal that is determined to not have been visited, the method 600 performs the processes of 650. In one example, 640 of the method 600 includes at 641, detecting the instance terminals of an instance of a device of the PIC design connected to the current net. 641 is performed based on a determination at 622, whether all of the pins have been visited. At 642*a* determination as to whether or not all of the instance terminals of an instance of a device of the PIC design have been visited is made. If at 642, all the instance terminals are determined to be visited, the method 600 proceeds to 670. If at 642, all of the instance terminals are determined to not be analyzed, an instance terminal is selected to be analyzed at 643. At 644, a determination as to whether or not the selected instance terminal has been visited at 644. If at 644, the selected instance terminal is determined to have been visited, the method 600 returns to 642. If at 644, the selected instance terminal is determined to not have been visited, the method 600 proceeds to 650.

At 650, an instance (e.g., second instance) of a device of a PIC design that the selected instance terminal is connected to is determined. Further, at 650, a determination is made as to whether the second instance is a leaf cell. A leaf cell is an instance with no internal hierarchy. If the second instance is not a leaf cell, the hierarchy of the instance is opened (e.g., expanded), and the path tracing process continues in each level of hierarchy by recursive calls to 610, resulting in a list of paths containing instances that is added to the result list and stored in the memory 120. In one example, 650 of the method 600 includes at 651, selecting a second instance connected to the current instance. At 652, a determination as to whether or not the instance is a leaf cell is made. If at 652, the instance is determined to be a leaf cell, the method proceeds to 660. If at 652, the instance is determined to not be a leaf cell, a pin at a higher hierarchical level of the selected instance is selected at 653. At 654, the third terminal (term) is set to the terminal connected to the pin at a higher hierarchical level of the instance. At 655, a determination as to whether or not a path exists between the third terminal (e.g., term), and the second terminal (e.g., term2). If at 655, a path is not detected, the method returns to 640. If at 655, a path is detected, the detected path is added to the results list and stored in the memory 120.

If the current instance is determined to be a leaf cell at 652, 660 is performed to determine the allowed connections from the selected instance terminals (instTerm) to the other instance terminals (instTerms) of the selected instance. For each instance terminal that has not been visited, the paths leading from unvisited instance terminals (calculated by recursive calls to 610) to the destination terminals are determined. Before each call to 610, the current set of visited terminals is stored within the memory 120. In one example, the set of visited terminals is stored within a stack within the memory 120. A stack is made up of contiguous blocks of the memory 120. In other examples, other memory configurations may be used to store the set of visited terminals. If paths are determined, the paths are added to the results list and the set of visited terminals is restored from the stack. Once all instance terminals (instTerms) of this instance have been analyzed, the system returns to 640 of the method 600.

In one example, at 661, instance terminals of a second instance of a PIC design are obtained. At 662, a determination as to whether or not each of the second instance terms have been analyzed. If at 662, a determination is made that each of the second instance terminals have been analyzed, the method 600 returns to 642. If at 662, a determination is made that each of the second instance terminals have not been analyzed, the method 600 proceeds to 663, where second instance terminal is set to the third terminal (e.g., term). At 664, a determination is made as to whether or not the third terminal has been visited. If at 664, the third terminal is determined to have been visited, the method returns to 662. If at 664, the terminal is determined to not have been visited, the method proceeds to 665 of the method 600. At 665, the terminal is added to the list of visited terminals, and at 666, the list of visited terminals is backed up. Backing up the list (set) of visited terminals includes making a copy of the list of visited terminals and saving the list to the memory 120. At 667, a determination as to whether or not paths between the third terminal (e.g., first terminal and second terminal) is determined. If at 667, no paths are determined, the method 600 returns to 662. If at 667, paths are determined, a determination as to whether or not each of the paths has been analyzed is made at 668. If at 668, all the paths are determined to have been analyzed, the method 600 proceeds to 669, where the listed of visited terminals is updated, and the method 600 returns to 662. If at 668, all of the paths are not determined to have been analyzed, the next path (e.g., a non-analyzed path) is selected at 670, and the path is set to include the selected instance and the path at 671 of the method 600. The path is added to the results list at 672 and the method 600 returns to 668.

At 680, the results (e.g., the identified paths) are output. If no paths are found, a −1 is output (or another value or indication representing no paths). In one example, the results may be output to a memory (e.g., the memory 120 of FIG. 1). Additionally, or alternatively, the results may be displayed by a display device (e.g., a video display unit 1010 of FIG. 10) and/or provided to another computer system via a network device (e.g., the network interface device 1008 of FIG. 10) via a network (e.g., the network 1020 of FIG. 10).

In one example, outputting the results at 680 of the method 600 includes 681, returning the results. Returning the results includes outputting the results as is described above. In one example, the results are returned at 681, based on a determination that at 682 that the results are not empty. At 682, if it is determined that the results are empty, a −1 is returned at 683. In other examples, at 683 of the method 600, a value other than −1 may be used to represent that the results are empty.

FIGS. 7A, 7B, and 7C illustrate example pseudo code 700 for determining a path between devices of a schematic of a PIC design. The pseudo code 700 is executed by one or more processors of the path tracer engine 110 of FIG. 1 to determine the path through a schematic of a PIC design (e.g., the PIC design 126). In one or more examples, the pseud code 700 corresponds to 610, 620, 630, 640, 650, 660, and 680 of FIGS. 6A, 6B, and 6C.

Figure 8:
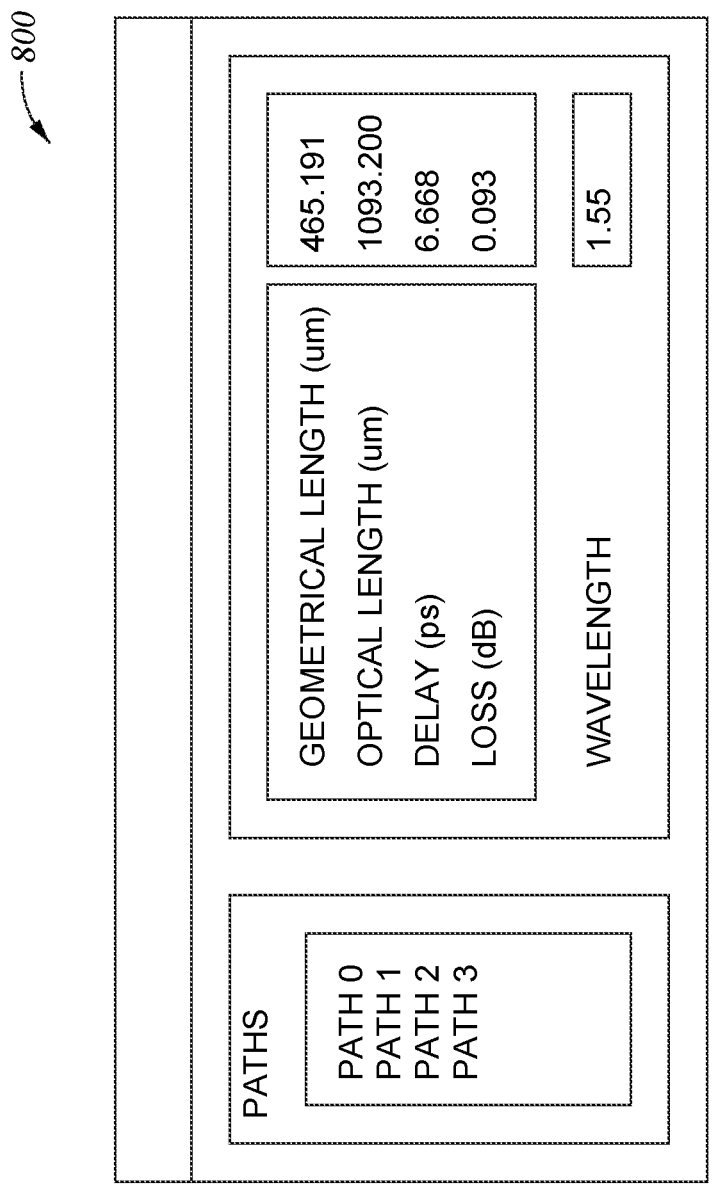
FIG. 8 illustrates an example user interface, according to one or more examples.

FIG. 8 illustrates a user interface 800 illustrating paths identified by the method 500 of FIG. 5, and/or the method 600 of FIGS. 6A, 6B, and 6C. (e.g., paths 430, 432, 434, and 436). The user interface 800 is displayed on a display device (e.g., the video display unit 1010 of FIG. 10). As is illustrated by the user interface 800, paths 0, 1, 2, and 3 and the corresponding properties are output for an associated wavelength. In the example of FIG. 8, the properties including geometrical length, optical length, delay, and loss for each path are output (e.g., displayed).

Figure 9:
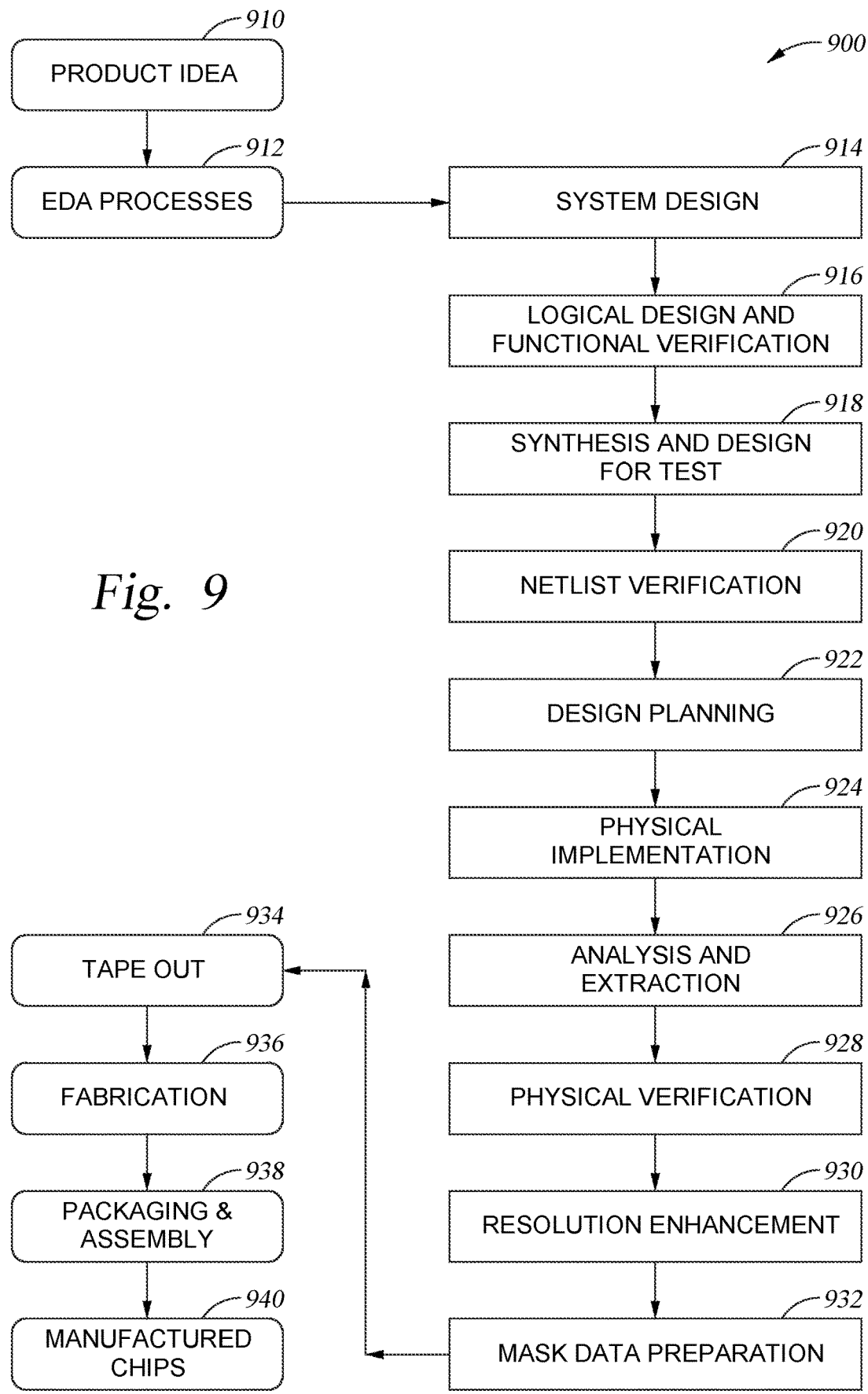
FIG. 9 depicts a flowchart of various processes used during the design and manufacture of an integrated circuit in accordance with some embodiments of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 9. The processes described by be enabled by EDA products (or EDA systems).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 10) may be used to store the programs and data structures that are used by some or all of the EDA products described herein, and products used for development of cells for the library and for physical and logical design that use the library.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alpha-numeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a nontransitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   receiving a photonic integrated circuit (PIC) design comprising a plurality of optical devices;
   determining a first optical path between a first photonic pin of a first optical device of the plurality of optical devices and a second photonic pin of a second optical device of the plurality of optical devices, wherein determining the first optical path comprises expanding two or more levels of hierarchy of the first optical device to determine the first optical path through the two or more levels of hierarchy;
   determining one or more optical properties of the first optical path based on a wavelength of a light signal, a property of the first optical device, and a property of the second optical device; and
   outputting, by a processor, the first optical path and the one or more optical properties.

2. The method of claim 1, wherein determining the first optical path between the first photonic pin of the first optical device and the second photonic pin of the second optical device comprises:
   detecting an optical net connecting the first photonic pin of the first optical device with an input photonic pin of a third optical device of the plurality of optical devices; and
   determining the input photonic pin of the third optical device is connected to an photonic output pin of the third optical device based on properties of the third optical device.

3. The method of claim 1, wherein determining the first optical path between the first photonic pin of the first optical device and the second photonic pin of the second optical device comprises:
  analyzing each candidate photonic pin of a plurality of candidate photonic pins to determine one or more candidate photonic pins connected to the first photonic pin of the first optical device via a corresponding optical net; and
  marking each analyzed candidate photonic pin as visited.

4. The method of claim 1 further comprising:
  determining a second optical path between the first photonic pin of the first optical device and the second photonic pin of the second optical device through of the plurality of optical devices;
  determining a second one or more optical properties of the second optical path; and
  outputting the second optical path and the second one or more optical properties.

5. The method of claim 4, wherein the first optical path and the second optical path differ in at least one or more of a number of optical devices, a set of optical devices, and an order of optical devices.

6. The method of claim 1, wherein the one or more optical properties includes one or more of a geometrical length of the first optical path, an optical length of the first optical path, an optical delay of the first optical path, and an optical loss associated with the first optical path.

7. The method of claim 1 further comprises determining all one or more optical devices along the first optical path, and the one or more optical properties of the first optical path is further based on the one or more optical devices.

8. The method of claim 1, wherein outputting the first optical path and the one or more optical properties comprises storing the first optical path and the one or more optical properties in a memory.

9. A system comprising:
  a memory storing instructions; and
  a processor, coupled with the memory and to execute the instructions, the instructions when executed cause the processor to:
    receive a photonic integrated circuit (PIC) design comprising a plurality of optical devices;
    determine a first optical path between a first photonic pin of a first optical device of the plurality of optical devices and a second photonic pin of a second optical device of the plurality of optical devices, wherein determining the first optical path comprises expanding two or more levels of hierarchy of the first optical device to determine the first optical path through the two or more levels of hierarchy;
    determine one or more optical properties of the first optical path based on a wavelength of a light signal, a property of the first optical device, and a property of the second optical device; and
    output the first optical path and the one or more optical properties.

10. The system of claim 9, wherein determining the first optical path between the first photonic pin of the first optical device and the second photonic pin of the second optical device comprises:
  detecting an optical net connecting the first photonic pin of the first optical device with an input photonic pin of a third optical device of the plurality of optical devices; and
  determining that the input photonic pin of the third optical device is connected to an output photonic pin of the third optical device based on properties of the third optical device.

11. The system of claim 9, wherein determining the first optical path between the first photonic pin of the first optical device and the second photonic pin of the second optical device comprises:
  analyzing each candidate photonic pin of a plurality of candidate photonic pins to determine one or more candidate photonic pins connected to the first photonic pin of the first optical device via a corresponding optical net; and
  marking each analyzed candidate photonic pin as visited.

12. The system of claim 9, wherein the processor is further configured to:
  determine a second optical path between the first photonic pin of the first optical device and the second photonic pin of the second optical device through of the plurality of optical devices;
  determining a second one or more optical properties of the second optical path; and
  outputting the second optical path and the second one or more optical properties, wherein the first optical path and the second optical path differ in at least one or more of a number of optical devices, a set of optical devices, or an order of optical devices.

13. The system of claim 9, wherein the one or more optical properties includes one or more of a geometrical length of the first optical path, an optical length of the first optical path, an optical delay of the first optical path, or an optical loss associated with the first optical path.

14. The system of claim 9, wherein the processor is further configured to determine one or more optical devices of the plurality of optical devices along the first optical path, and the one or more optical properties of the first optical path is further based on the one or more optical devices.

15. The system of claim 9, wherein outputting the first optical path and the one or more optical properties comprises storing the first optical path and the one or more optical properties in a memory.

16. A computer implemented method for displaying properties of a photonic integrated circuit (PIC) design within a user interface, the method comprising:
  receiving the PIC design comprising a plurality of optical devices, the plurality of optical devices comprises a first optical device, a second optical device, and a third optical device, wherein the third optical device is a hierarchical device comprising two or more levels of hierarchy;
  determining a first optical path between a first photonic pin of the first optical device and a second photonic pin of the second optical device by expanding the two or more levels of hierarchy of the third optical device, wherein the first optical path traverses the two or more levels of hierarchy of the third optical device;
  determining one or more optical properties of the first optical path based on a wavelength of a light signal, the first optical device and the second optical device; and
  displaying, by a processor, the one or more optical properties within the user interface on a display device.

17. The method of claim 16 further comprising:
  determining an optical path through each of the two or more levels of hierarchy of the third optical device.

18. The method of claim 16, wherein determining the first optical path between the first photonic pin of the first optical device and the second photonic pin of the second optical device comprises:
- detecting an optical net connecting the first photonic pin of the first optical device with an input photonic pin of the third optical device; and
- determining that the input photonic pin of the third optical device is connected to an output photonic pin of the third optical device based on properties of the third optical device.

* * * * *